United States Patent
Lee

(10) Patent No.: US 11,069,092 B2
(45) Date of Patent: Jul. 20, 2021

(54) APPARATUS FOR PROVIDING TOP VIEW IMAGE OF PARKING SPACE AND METHOD THEREOF

(71) Applicants: Hyundai Motor Company, Seoul (KR); Kia Motors Corporation, Seoul (KR)

(72) Inventor: Yong Joon Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/659,826

(22) Filed: Oct. 22, 2019

(65) Prior Publication Data

US 2020/0357145 A1   Nov. 12, 2020

(30) Foreign Application Priority Data

May 8, 2019   (KR) .................. 10-2019-0053491

(51) Int. Cl.
*G06T 11/00* (2006.01)
*G08G 1/14* (2006.01)
*G06F 3/14* (2006.01)
*G06K 9/00* (2006.01)

(52) U.S. Cl.
CPC .............. *G06T 11/00* (2013.01); *G06F 3/14* (2013.01); *G06K 9/00812* (2013.01); *G08G 1/143* (2013.01)

(58) Field of Classification Search
None
See application file for complete search history.

(56) References Cited

U.S. PATENT DOCUMENTS

| | | | |
|---|---|---|---|
| 2017/0043808 A1* | 2/2017 | Yang | G08G 1/143 |
| 2020/0062242 A1* | 2/2020 | Hayakawa | G08G 1/143 |
| 2020/0108824 A1* | 4/2020 | Bettger | B62D 15/0285 |
| 2021/0118299 A1* | 4/2021 | Yata | G08G 1/141 |

FOREIGN PATENT DOCUMENTS

KR   20150106685 A   9/2015

\* cited by examiner

*Primary Examiner* — Vu Nguyen
(74) *Attorney, Agent, or Firm* — Mintz Levin Cohn Ferris Glovsky and Popeo, P.C.; Peter F. Corless

(57) ABSTRACT

An apparatus for providing a top view image of a parking space includes a top view image generating device that generates a top view image of a parking space, a display that displays the top view image generated by the top view image generating device, and a controller that captures the top view image displayed by the display and connects the top view image previously captured to a current top view image generated by the top view image generating device to generate a combined top view image of an entire parking space.

12 Claims, 11 Drawing Sheets

APPARATUS FOR PROVIDING TOP VIEW IMAGE OF PARKING SPACE AND METHOD THEREOF

CROSS-REFERENCE TO RELATED APPLICATION

This application claims under 35 U.S.C. § 119(a) the benefit of Korean Patent Application No. 10-2019-0053491, filed in the Korean Intellectual Property Office on May 8, 2019, the entire contents of which are incorporated herein by reference.

BACKGROUND

(a) Technical Field

The present disclosure relates to a technique for providing a top view image of a parking space in a vehicle.

(b) Description of the Related Art

FIG. 1 (PRIOR ART) is a view illustrating an example of a top view image of a conventional parking space.

As illustrated in FIG. 1, an apparatus for providing a top view image of a parking space according to the related art provides a top view image of a limited area (e.g., an area within 3-4 meters from a subject vehicle) based on an image of a parking space photographed in real time through a plurality of cameras provided in a vehicle. In this case, when the vehicle slowly advances, because the image of the parking space to be photographed changes, the top view image also changes accordingly.

In addition, in the apparatus for providing the top view image of the parking space according to the related art, an icon 11 indicating that parking is possible is displayed in an empty parking space included in the top view image, and an icon 12 indicating that an empty parking space exists in the direction of the empty parking space is displayed because the icon indicating that parking is possible cannot be directly displayed in an empty parking space not included in the top view image.

Because such an apparatus for providing a top view image of a parking space according to the related art provides a top view image of a parking space in a specified area based on a vehicle, but cannot provide a top view image of the entire parking space searched by a parking support system of the vehicle, it is impossible for a user to select an empty parking space included in the top view image previously displayed, thereby limiting the selection of the user.

SUMMARY

An aspect of the present disclosure provides an apparatus for providing a top view image of a parking space which captures and stores the top view image of the parking space displayed and sequentially connects previous top view images based on a current top view image in response to a request of a user to provide a top view image of the entire parking space to enable the user to freely select an empty parking space desired by the user, and a method thereof.

According to an aspect of the present disclosure, an apparatus for providing a top view image of a parking space includes a top view image generating device that generates the top view image of the parking space, a display that displays the top view image generated by the top view image generating device, and a controller that captures the top view image displayed by the display and connects the top view image previously captured to a current top view image generated by the top view image generating device to generate a combined top view image of an entire parking space.

The controller may control the display such that the generated combined top view image of the entire parking space is displayed in response to a request of a user.

The apparatus may further include a sensor provided on a rear portion of a vehicle to sense a movement around an empty parking space. In this case, the controller may control the display such that an icon of indicating an attention to the empty parking space in which the movement is sensed by the sensor is further displayed on the combined top view image of the entire parking space. In addition, the sensor may include at least one of an ultrasonic sensor, a rear camera, and a radar.

In addition, the controller may store the captured top view image in storage. In this case, the controller may determine that the top view image stored in the storage is invalid when a lifetime of the top view image stored in the storage exceeds a threshold time, and delete the top view image. In addition, the controller may generate the combined top view image of the entire parking space by sequentially connecting previous top view images stored in the storage based on the current top view image generated by the top view image generating device.

In addition, the controller may limit the length of the combined top view image of the entire parking space. For example, the controller may generate the combined top view image of the entire parking space having a preset length.

According to another aspect of the present disclosure, a method of providing a top view image of a parking space includes generating, by a top view image generating device, the top view image of the parking space, displaying, by a display, the top view image generated by the top view image generating device, capturing, by a controller, the top view image displayed by the display, and connecting, by the controller, the top view image previously captured to a generated current top view image to generate a combined top view image of an entire parking space.

The method may further include displaying, by the display, the combined top view image of the entire parking space in response to a request of a user.

The method may further include sensing, by a sensor provided on a rear portion of a vehicle, a movement around an empty parking space, and further displaying, by the display, an icon of indicating an attention to the empty parking space, in which the movement is sensed by the sensor, on the combined top view image of the entire parking space. The sensor may include at least one of an ultrasonic sensor, a rear camera, and a radar.

The method may further include storing, by the controller, the captured top view image in storage, and determining, by the controller, that the top view image stored in the storage is invalid when a lifetime of the top view image stored in the storage exceeds a threshold time, and deleting the top view image. Generating the combined top view image of the entire parking space may include generating, by the controller, the combined top view image of the entire parking space by sequentially connecting previous top view images stored in the storage based on the current top view image generated by the top view image generating device.

In addition, generating the combined top view image of the entire parking space may include generating the combined top view image of the entire parking space having a preset length.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
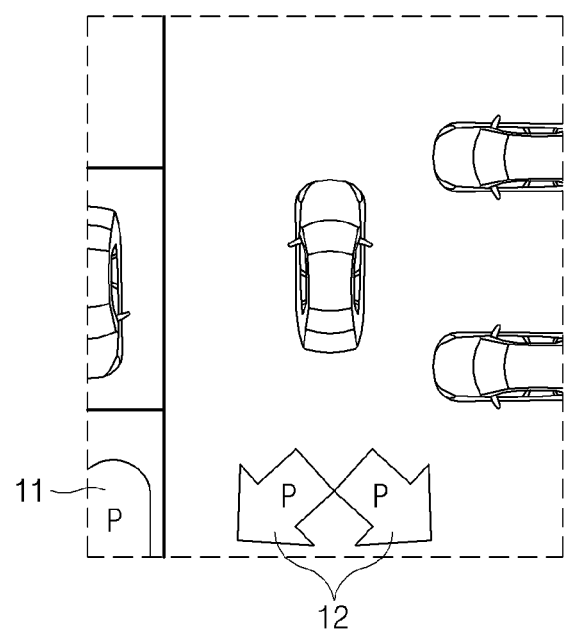
FIG. 1 (PRIOR ART) is a view illustrating an example of a top view image of a conventional parking space.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
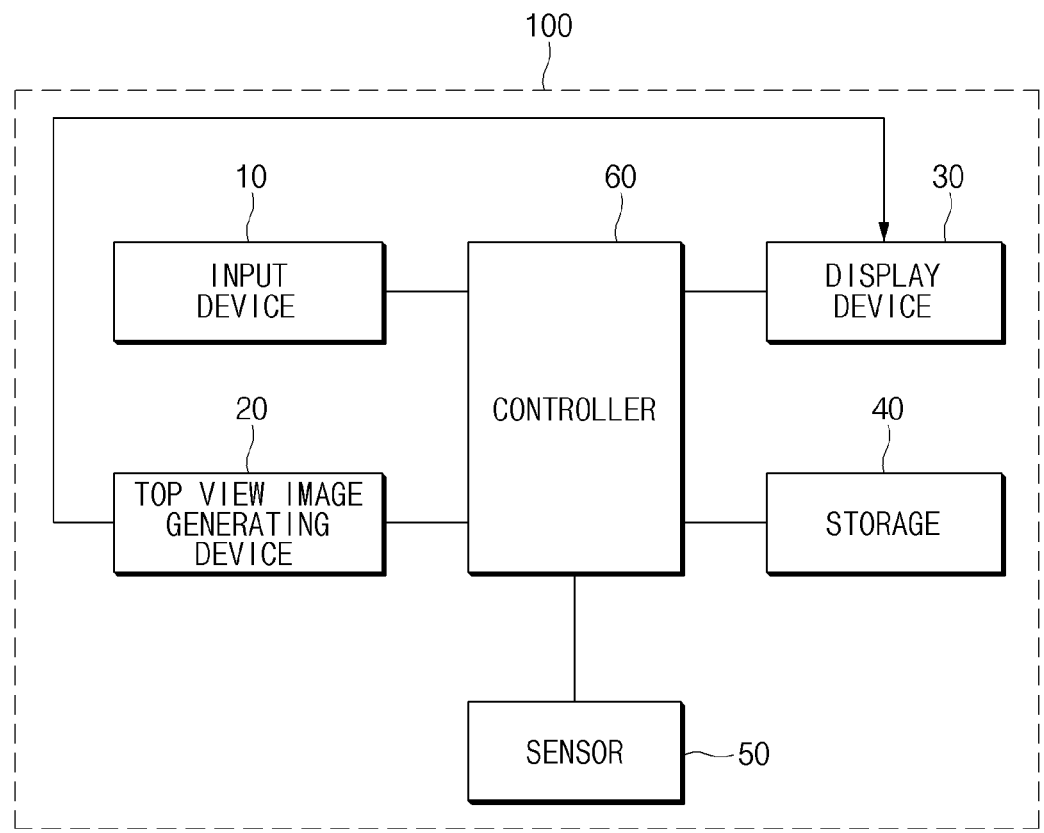
FIG. 2 is a block diagram illustrating an apparatus for providing a top view image of a parking space according to an embodiment of the present disclosure.

FIG. 2 is a block diagram illustrating an apparatus for providing a top view image of a parking space according to an embodiment of the present disclosure.

As shown in FIG. 2, an apparatus 100 for providing atop view image of a parking space according to an embodiment of the present disclosure may include an input device 10, a top view image generating device 20, a display device 30, storage 40, a sensor 50, and a controller 60. In this case, according to the scheme of implementing the apparatus 100 for providing a top view image of a parking space according to an embodiment of the present disclosure, components may be combined with one another, or some components may be omitted.

Referring to each component, first, the input device 10 may receive a command to display a top view image of a current parking space from a user, and also receive a command to display a combined top view image of an entire parking space from the user.

The input device 10 may receive a request of a user in various schemes such as a screen touch scheme, a button input scheme, and the like. In this case, the input device 10 may receive a swipe for screen movement as a screen touch scheme.

The top view image generating device 20 may generate a top view image of a parking space by using a two-dimensional image of the parking space photographed by a plurality of cameras provided in the vehicle.

Hereinafter, the detailed configuration of the top view image generating device 20 will be described with reference to FIG. 3, but the embodiment is not limited thereto.

Figure 3:
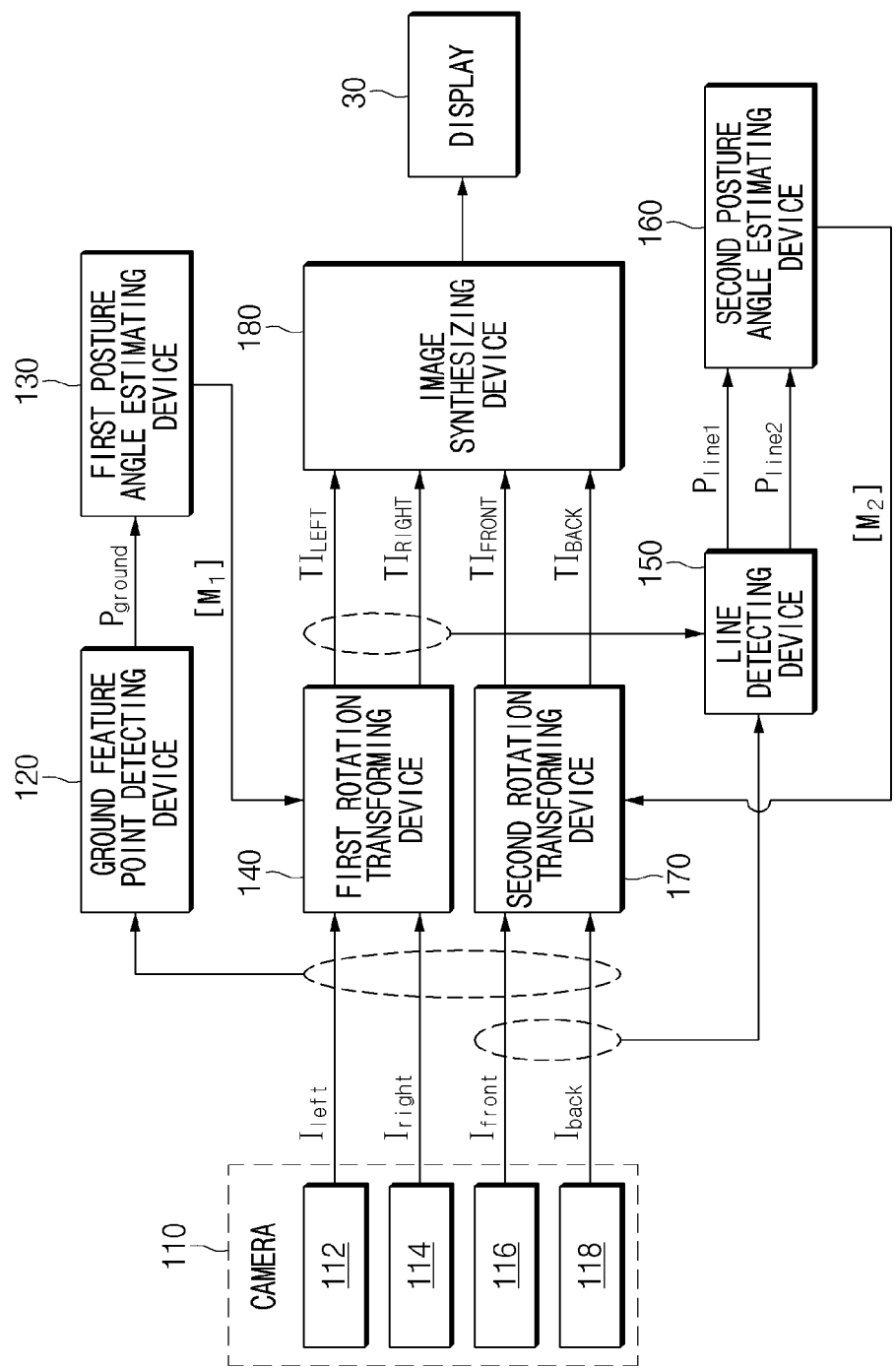
FIG. 3 is a detailed block diagram of a top view image generating device included in the apparatus for providing a top view image of a parking space according to an embodiment of the present disclosure.

FIG. 3 is a detailed block diagram of a top view image generating device included in the apparatus for providing a top view image of a parking space according to an embodiment of the present disclosure.

As shown in FIG. 3, the top view image generating device 20 included in the apparatus 100 for providing a top view image of a parking space according to an embodiment of the present disclosure may include a camera 110, a ground feature point detecting device 120, a first posture angle estimating device 130, a first rotation transforming device 140, a line detecting device 150, a second posture angle estimating device 160, a second rotation transforming device 170, and an image synthesizing device 180.

The camera 110 includes a left camera 112 installed at a lower end of a left side mirror of the vehicle, a right camera 114 installed at a lower end of a right side mirror of the vehicle, a front camera 116 installed at a front of the vehicle, and a rear camera 118 installed at a rear of the vehicle.

The left camera 112 photographs a left side ground of the vehicle to generate a left image $I_{left}$ in units of frames, and the right camera 114 photographs a right side ground of the vehicle to generate a right image $I_{right}$ in units of frames.

The front camera 116 photographs a front ground of the vehicle to generate a front image $I_{front}$ in units of frames, and the rear camera 118 photographs a rear ground of the vehicle to generate a rear image $I_{back}$ in units of frames.

The ground feature point detecting device 120 detects a ground feature point $P_{ground}$ and a motion vector of the ground feature point $P_{ground}$ in units of frames from at least one image, from which the ground feature point $P_{ground}$ is capable of being detected, among the left image $I_{left}$ provided from the left camera 112, the right image $I_{right}$ provided from the right camera 114, the front image $I_{front}$ provided from the front camera 116, and the rear image $I_{back}$ of the rear camera 118. In this case, the image from which the ground feature point ($P_{ground}$) is capable of being detected may include a left or right image.

As a scheme of detecting the ground feature point $P_{ground}$ and the motion vector of the ground feature point $P_{ground}$ from the left or right image, an optical flow-based feature point extraction algorithm such as a block matching method, Horn-Schunck algorithm, Lucas-Kanade algorithm, Gunnar Fameback's algorithm, and the like may be used. In this case, because the algorithms are well known in the art, the details will be omitted.

The first posture angle estimating device 130 estimates a first posture angle of the left and right cameras 112 and 114 based on the ground feature point $P_{ground}$ and the motion vector of the ground feature point $P_{ground}$, and generates a transformation matrix $[M_1]$ in which the estimated first posture angle is expressed in a matrix form.

The first rotation transforming device 140 rotation-transforms the left image $I_{left}$ and the right image $I_{right}$ based on the transformation matrix $[M_1]$ input from the first posture angle estimating device 130, thereby generating a first top view image. In this case, the first top view image includes a left top view image $TI_{LEFT}$ obtained by rotation-transforming the left image $I_{left}$ using the transformation matrix $[M_1]$ and a right top view image $TI_{RIGHT}$ obtained by rotation-transforming the right image $I_{right}$ using the transformation matrix $[M_1]$.

The line detecting device 150 detects a first parking space division line $P_{line1}$ in the left and right top view images $TI_{LEFT}$ and $TI_{RIGHT}$ input from the first rotation transforming device 140. In this case, the first parking space division line $P_{line1}$ includes a left parking space division line detected in the left top view image $TI_{LEFT}$ and a right parking space division line detected in the right top view image $TI_{RIGHT}$.

As the scheme for detecting the left and right parking space division lines in the left and right top view images $TI_{LEFT}$ and $TI_{RIGHT}$, a line detection algorithm may be used. Because the present disclosure is not characterized by the line detection algorithm, the detailed description will be omitted. In addition, because the technique capable of obtaining information related to a line such as thickness, direction, and the like of the line as well as a line through such a line detection algorithm is well known in the art, the detailed description thereof will be omitted.

In addition, the line detecting device 150 detects a second parking space division line $P_{line2}$ connected to the first parking space division line $P_{line1}$ in the front image $I_{front}$ and the rear image $I_{back}$ inputted from the camera 110. In this case, the second parking space division line $P_{line2}$ includes an upper parking space division line in the front image $I_{front}$ and a lower parking space division line detected in the rear image $I_{back}$.

The second posture angle estimating device 160 estimates a second posture angle of the front and rear cameras 116 and 118 based on the corresponding relationship between the feature patterns of the first and second parking space division lines $P_{line1}$ and $P_{line2}$ input from the line detecting device 150, and generates a transformation matrix $[M_2]$ that represents the estimated second posture angle in a matrix form.

The second rotation transforming device 170 generates the second top view image by rotation-transforming the front and rear images $I_{front}$ and $I_{back}$ using the transformation matrix $[M_2]$ input from the second posture angle estimating device 160. In this case, the second top view image includes a front top view image $TI_{FRONT}$ obtained by rotation-transforming the front image $I_{front}$ using the transformation matrix [M2] and a rear top view image $TI_{BACK}$ obtained by rotation-transforming the rear image Lack using the transformation matrix $[M_2]$.

The image synthesizing device 180 synthesizes the first top view image $TI_{LEFT}$ and $TI_{RIGHT}$ input from the first rotation transforming device 140 and the second top view image $TI_{FRONT}$ and $TI_{BACK}$ input from the second rotation transforming device 170, thereby generating the final top view image.

Because the configuration of the above-described top view image generating device 20 is an example and the technique of generating the top view image is not a feature of the present disclosure, any known technique may be used.

A display 30 displays the top view image of the parking space generated by the top view image generating device 20. In this case, the top view image of the parking space may further include an icon indicating an empty parking space.

The display 30 may display the combined top view image of the entire parking space to which the previous top view images are sequentially connected based on the current top view image.

The display 30 may include a liquid crystal display (LCD), a thin film transistor liquid crystal display (TFT LCD), an organic light emitting diode (OLED), a flexible display, a 3D display, and an e-ink display.

The storage 40 may capture and store the top view image of the parking space displayed by the display 30, and may store various logics, algorithms and programs that are required to sequentially connects the previous top view images based on the current top view image to provide the combined top view image of the entire parking space in response to the request of a user.

The storage 40 may store the top view image of the parking space captured by the controller 60.

The storage 40 may include at least one type of a storage medium of memories of a flash memory type, a hard disk type, a micro type, a card type (e.g., a secure digital (SD) card or an extreme digital (XD) card), and the like and a random access memory (RAM), a read-only memory (ROM), a programmable ROM (PROM), an electrically erasable PROM (EEPROM), a magnetic disk, and an optical disk type memory.

The sensor 50 is mounted on the rear portion of the vehicle and senses the motion around the parking space. That is, the sensor 50 may sense a vehicle approaching an empty parking space, or may sense a vehicle leaving the parking space.

The sensor 50 may include at least one of an ultrasonic sensor, a rear camera, and a radar.

The controller 60 performs overall control such that each component can perform the function thereof normally. The controller 60 may be implemented in the form of hardware or software, or a combination of hardware and software. Preferably, the controller 60 may be implemented with a microprocessor, but the embodiment is not limited thereto.

The controller 60 may control the display 30 to display the top view image of the parking space generated by the top view image generating device 20. In this case, the top view image displayed by the display 30 is a real time image as shown in FIG. 1.

The controller 60 may capture the top view image of the parking space displayed by the display 30 and store the top view image in the storage 40. In this case, the controller 60 may determine that the top view image is invalid when the lifetime of the top view image stored in the storage 40 exceeds the threshold time (e.g., 5 or 10 minutes) and may delete the top view image. That is, the controller 60 may delete the top view images whose storage time exceeds the threshold time, among the top view images stored in the storage 40.

Figure 4:
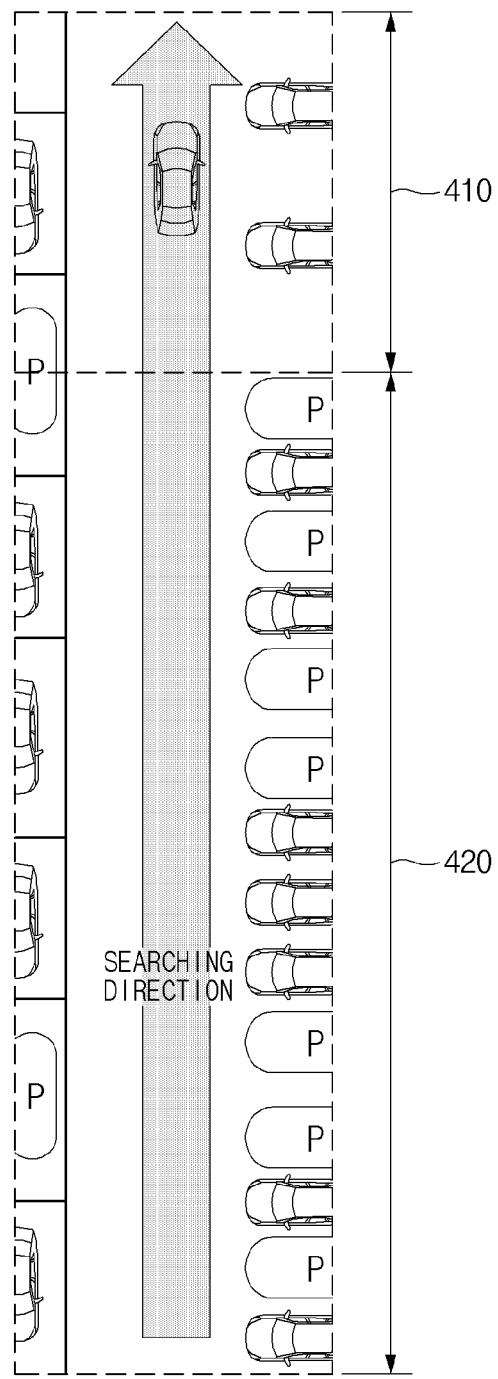
FIG. 4 is a view illustrating a combined top view image of an entire parking space generated by an apparatus for providing a top view image of a parking space according to an embodiment of the present disclosure.

The controller 60 may sequentially connect the previous top view images stored in the storage 40 based on the current top view image generated in real time by the top view image generating device 20, thereby generating the combined top view image of the entire parking space as shown in FIG. 4.

FIG. 4 is a view illustrating a combined top view image of an entire parking space generated by an apparatus for providing a top view image of a parking space according to an embodiment of the present disclosure.

In FIG. 4, reference numeral 410 denotes a top view image of a parking space provided in real time, and reference numeral 420 denotes a top view image obtained by capturing a top view image previously displayed through the display 30. In this case, the entire parking space means a parking space on the route along which the vehicle travels in a state where the top view image generating device 20 is activated by the controller 60.

Hereinafter, a process of generating (synthesizing) a combined top view image of an entire parking space will be described in detail with reference to FIGS. 5A and 5B.

Figure 5A:
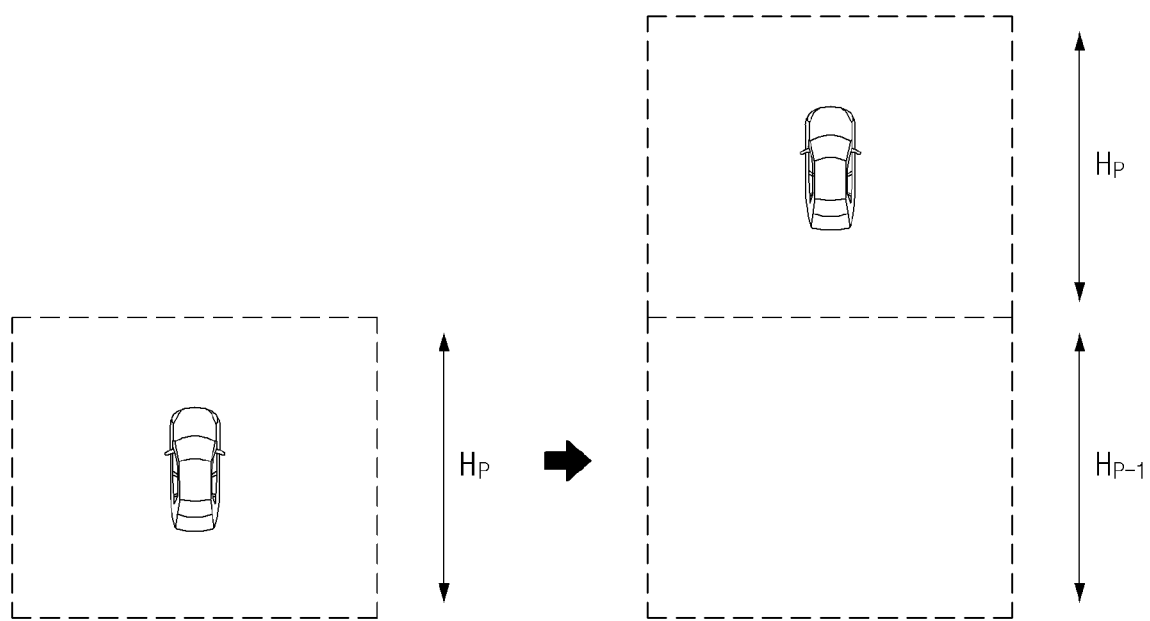
FIGS. 5A and 5B are views illustrating a process of generating a combined top view image of an entire parking space by an apparatus for providing a top view image of a parking space according to an embodiment of the present disclosure.
Figure 5B:
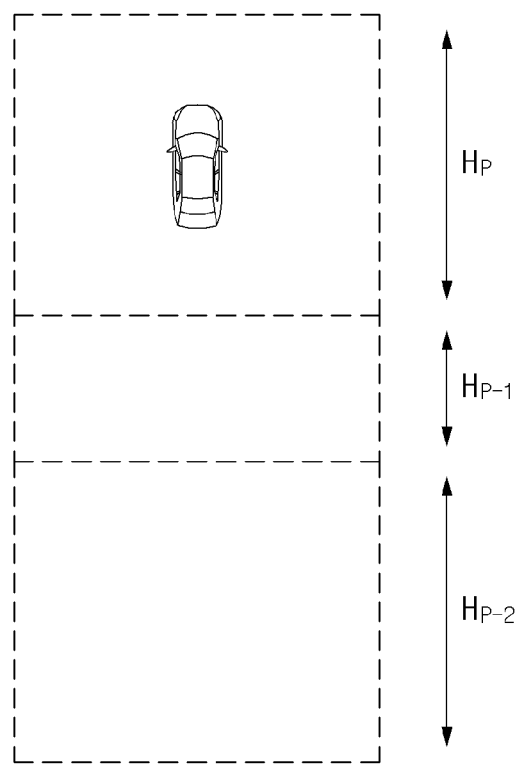

FIGS. 5A and 5B are views illustrating a process of generating a combined top view image of an entire parking space by an apparatus for providing a top view image of a parking space according to an embodiment of the present disclosure.

In FIG. 5A, $H_p$ represents a current top view image, and $H_{p-1}$ represents a previous top view image. In this case, the size of a top view image is equal to the screen size of the display 30.

Therefore, the controller 60 may generate the combined top view image of the entire parking space by connecting the previous top view image $H_{p-1}$ based on the current top view image $H_p$.

However, the time at which the combined top view image of the entire parking space is generated may not necessarily coincide with the time at which the current top view image $H_p$ and the previous top view image $H_{p-1}$ are generated.

That is, as shown in FIG. 5B, the first top view image $H_{p-2}$ is generated and then the top view image $H_{p-1}$ is generated. However, the current top view image $H_p$ and the previous top view image $H_{p-1}$ may overlap. In this case, the first top view image $H_{p-2}$ and the next top view image Ho are captured images, and the current top view image $H_p$ is an image provided in real time.

In this case, because the reference is the current top view image $H_p$, after the portion overlapping the current top view image $H_p$ in the previous top view image $H_{p-1}$ is cut off, the remaining top view image $H_{p-1}$ and the first top view image $H_{p-2}$ are sequentially connected to the current top view image $H_p$, thereby generating the combined top view image of the entire parking space.

The controller 60 may arbitrarily adjust the length of the combined top view image of the entire parking space. That is, the controller 60 may arbitrarily adjust the size of the entire parking space displayed on the display 30.

Figure 6:
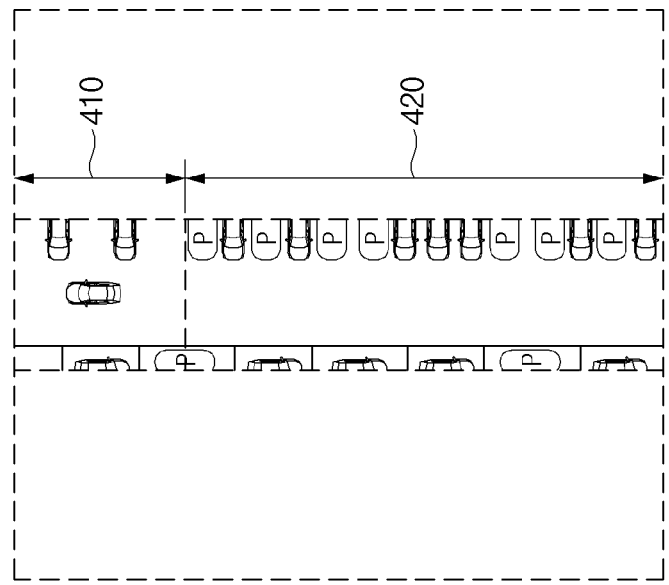
FIG. 6 is a view illustrating a state where a combined top view image of an entire parking space is display on a display provided in an apparatus for providing a top view image of a parking space according to an embodiment of the present disclosure.
Figure 6:
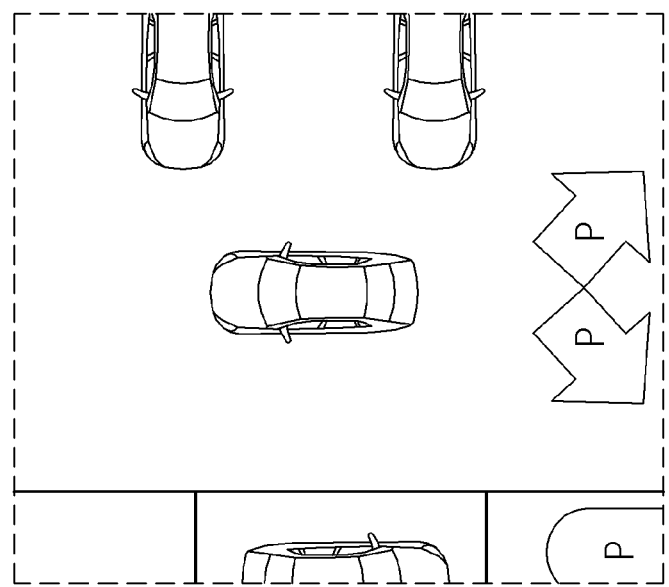

As shown in FIG. 6, the controller 60 may control the display 30 to display the combined top view image of the entire parking space.

FIG. 6 is a view illustrating a state where a combined top view image of an entire parking space is display on a display provided in an apparatus for providing a top view image of a parking space according to an embodiment of the present disclosure.

As shown in FIG. 6, the display 30 displays the direction of the parking space by an arrow to notify a driver of an empty parking space that is not displayed on the top view image of a partial parking space. However, because the empty parking space is displayed on the combined top view image of the entire parking space, the arrow is not displayed.

Meanwhile, the controller 60 may further generate location information of an empty parking space on the top view image generated by the top view image generating device 20.

Figure 7:
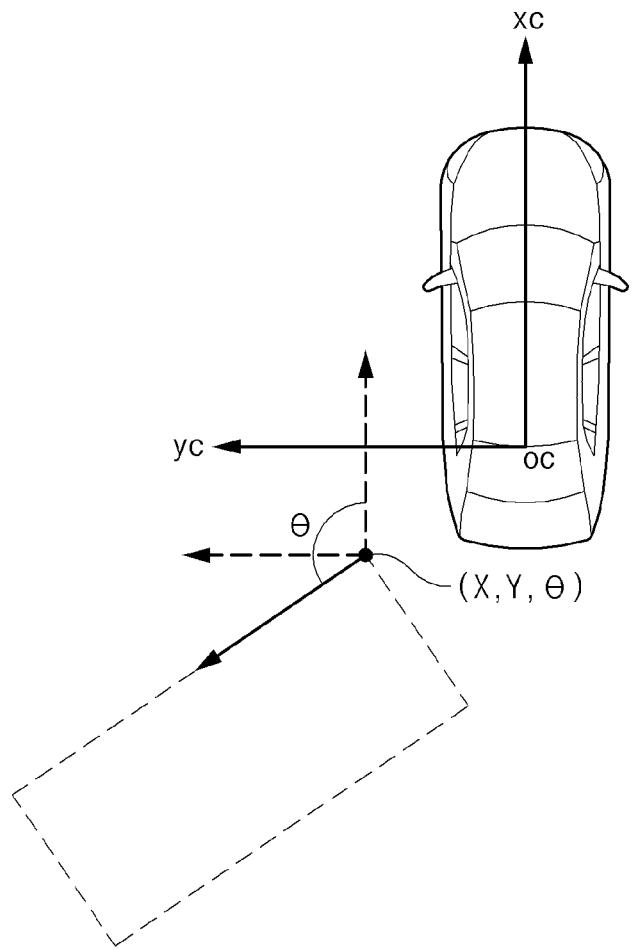
FIG. 7 is a view illustrating location information of an empty parking space provided by an apparatus for providing a top view image of a parking space according to an embodiment of the present disclosure.

FIG. 7 is a view illustrating location information of an empty parking space provided by an apparatus for providing a top view image of a parking space according to an embodiment of the present disclosure.

In FIG. 7, 'xc' represents a longitudinal axis of a vehicle, 'yc' represents a lateral axis of a vehicle, 'oc' represents the center of a rear wheel shaft of a vehicle as the reference point (0,0), and 'θ' represents an angle (°) of an empty parking space from the xc axis.

Therefore, the location coordinates of an empty parking space may be expressed as (x, y, θ). In this case, the location coordinates indicate the location of the upper left corner of the empty parking space when the empty parking space is located at the left side of the vehicle, and the location of the upper right corner of the empty parking space when the empty parking space is located at the right side. In addition, 'x' is an x coordinate with respect to the xc-yc axis and the unit of distance is cm. 'y' is a y coordinate with respect to the xc-yc axis and the unit of distance is cm. For example, when 'x' is 50, it is spaced apart from the xc axis by 50 cm.

In addition, the controller 60 may control the display 30 to display, on the basis of the movement around the empty parking space located behind the vehicle sensed by the sensor 50, an icon 810 indicating the attention to the corresponding empty parking space in the combined top view image of the entire parking space. In this case, the top view image displayed by the display 30 is as shown in FIG. 8.

Figure 8:
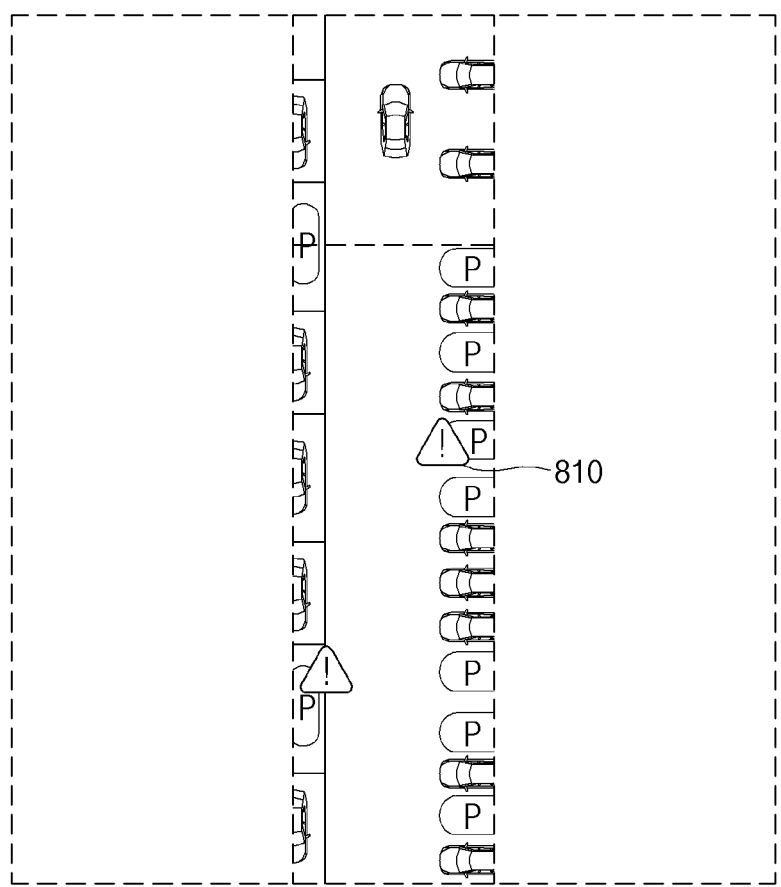
FIG. 8 is a view illustrating a state in which a display provided in an apparatus for providing atop view image of a parking space according to an embodiment of the present disclosure displays an icon indicating an attention on a combined top view image of an entire parking space.

FIG. 8 is a view illustrating a state in which a display provided in an apparatus for providing a top view image of a parking space according to an embodiment of the present disclosure displays an icon indicating an attention on a combined top view image of an entire parking space.

As shown in FIG. 8, the area indicated by 'P' in the combined top view image of the entire parking space represents an empty parking space, and when the movement is detected in the specific empty parking space, the controller 60 controls the display 30 to display the icon 810 on the specific empty parking space.

The empty parking space in which the icon 810 is displayed is a space requiring confirmation by the driver. The driver must park the vehicle in the parking space after confirming the parking space before parking the vehicle in the empty parking space where the icon 810 is displayed. In this case, the automatic parking may be performed when the parking trajectory to the empty parking space where the icon 810 is displayed is calculated, and the manual parking may be performed when the parking trajectory is not calculated.

Figure 9:
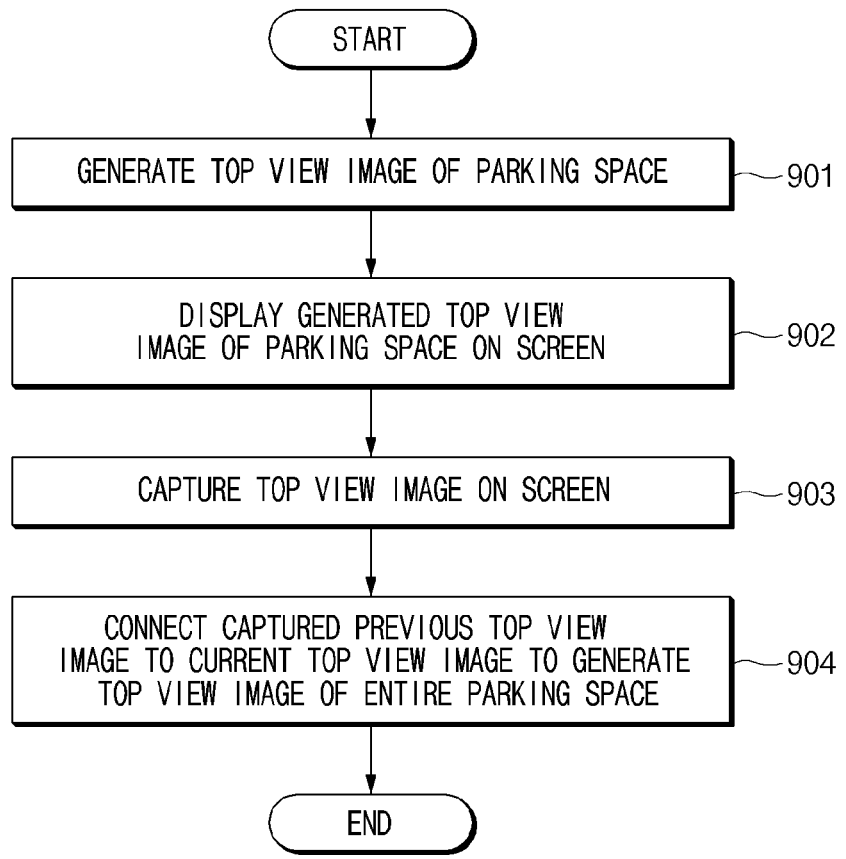
FIG. 9 is a flowchart illustrating a method of providing a top view image of a parking space according to an embodiment of the present disclosure.

FIG. 9 is a flowchart illustrating a method of providing a top view image of a parking space according to an embodiment of the present disclosure.

First, in operation 901, the top view image generating device 20 generates a top view image of a parking space.

Thereafter, in operation 902, the display 30 displays the top view image generated by the top view image generating device 20 on the screen under control of the controller 60.

Thereafter, in operation 903, the controller 60 captures the top view image displayed by the display 30.

Thereafter, in operation 904, the controller 60 generates (synthesizes) the combined top view image of the entire parking space by connecting the captured previous top view image to the current top view image generated by the top view image generating device 20.

Figure 10:
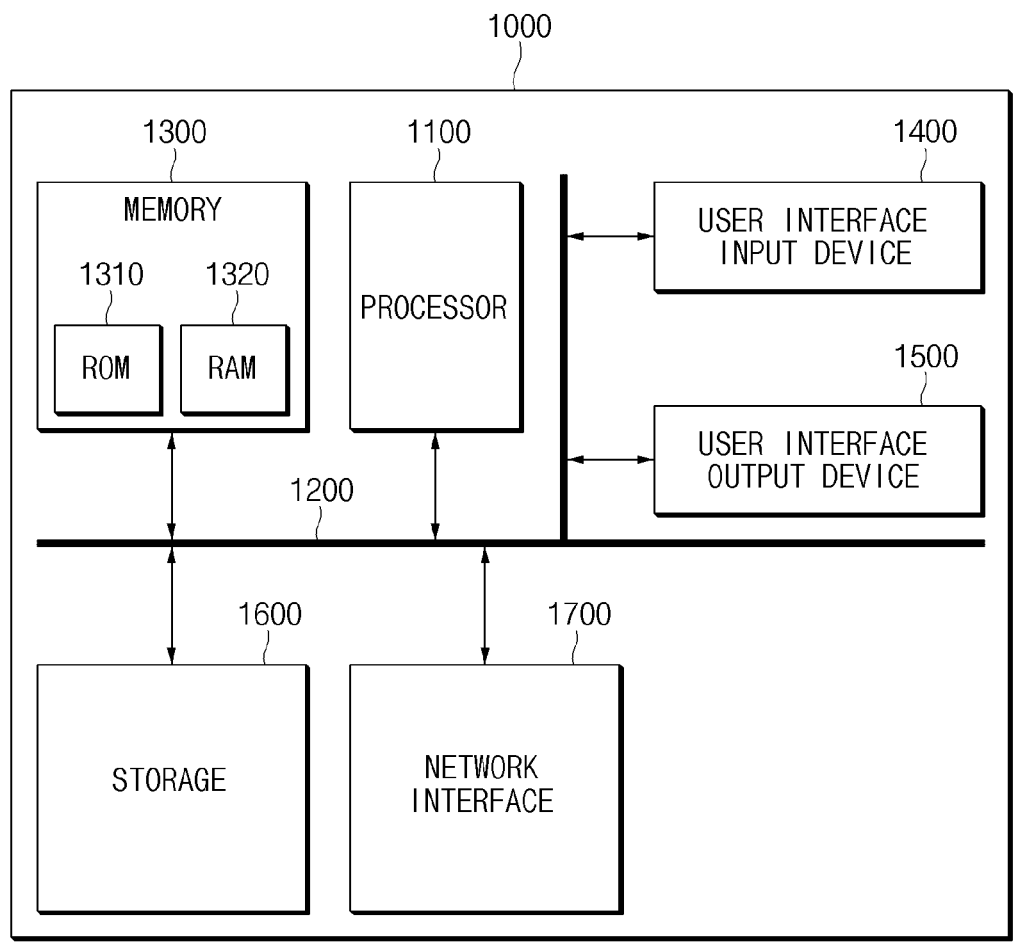
FIG. 10 is a block diagram illustrating a computing system for executing a method of providing atop view image of a parking space according to an embodiment of the present disclosure.

FIG. 10 is a block diagram illustrating a computing system for executing a method of providing a top view image of a parking space according to an embodiment of the present disclosure.

Referring to FIG. 10, the method of providing a top view image of a parking space according to an embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processor (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the apparatus for providing a top view image of a parking space and the method thereof according to an embodiment of the present disclosure, the top view image of the parking space displayed is captured and stored, and previous top view images are sequentially connected based on a current top view image in response to a request of a user to provide the combined top view image of the entire parking space, thereby enabling the user to freely select an empty parking space desired by the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for providing a top view image of a parking space, the apparatus comprising:
   a sensor configured to sense a vehicle approaching an empty parking space;
   a top view image generating device configured to generate the top view image of the parking space;
   a display configured to display the top view image generated by the top view image generating device; and
   a controller configured to capture the top view image displayed by the display and connect the top view image previously captured to a current top view image generated by the top view image generating device to generate a combined top view image of an entire parking space, wherein the controller is configured to control the display such that the generated combined top view image of the entire parking space is displayed in response to a request of a user, and wherein the controller is configured to control the display such that an icon of indicating an attention to the empty parking space in which the vehicle is sensed by the sensor is further displayed on the combined top view image of the entire parking space.

2. The apparatus of claim 1, wherein the sensor includes at least one of an ultrasonic sensor, a rear camera, and a radar.

3. The apparatus of claim 1, wherein the controller is configured to store the captured top view image in storage.

4. The apparatus of claim 3, wherein the controller is configured to determine that the top view image stored in the storage is invalid when a lifetime of the top view image stored in the storage exceeds a threshold time, and delete the top view image.

5. The apparatus of claim 4, wherein the controller is configured to generate the combined top view image of the entire parking space by sequentially connecting previous top view images stored in the storage based on the current top view image generated by the top view image generating device.

6. The apparatus of claim 1, wherein the controller is configured to generate the combined top view image of the entire parking space having a preset length.

7. A method of providing a top view image of a parking space, the method comprising:
- generating, by a top view image generating device, the top view image of the parking space;
- displaying, by a display, the top view image generated by the top view image generating device;
- capturing, by a controller, the top view image displayed by the display;
- connecting, by the controller, the top view image previously captured to a generated current top view image to generate a combined top view image of an entire parking space;
- displaying, by the display, the combined top view image of the entire parking space in response to a request of a user;
- sensing, by a sensor provided on a rear portion of a vehicle, a vehicle approaching an empty parking space; and
- further displaying, by the display, an icon of indicating an attention to the empty parking space, in which the vehicle is sensed by the sensor, on the combined top view image of the entire parking space.

8. The method of claim 7, wherein the sensor includes at least one of an ultrasonic sensor, a rear camera, and a radar.

9. The method of claim 7, further comprising:
- storing, by the controller, the captured top view image in storage.

10. The method of claim 9, further comprising:
- determining, by the controller, that the top view image stored in the storage is invalid when a lifetime of the top view image stored in the storage exceeds a threshold time, and deleting the top view image.

11. The method of claim 10, wherein generating the combined top view image of the entire parking space includes generating, by the controller, the combined top view image of the entire parking space by sequentially connecting previous top view images stored in the storage based on the current top view image generated by the top view image generating device.

12. The method of claim 7, wherein generating the combined top view image of the entire parking space includes generating the combined top view image of the entire parking space having a preset length.

* * * * *